July 21, 1936.   H. J. WILLEMS   2,048,364
COMBINATION FROZEN CONFECTION
Filed Feb. 20, 1935
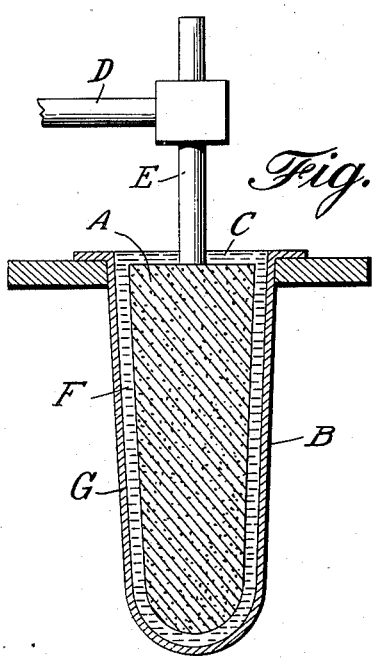
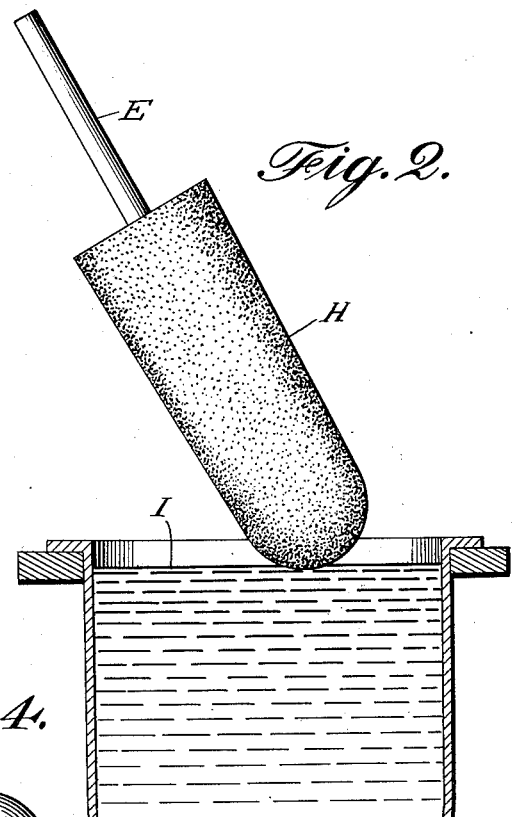
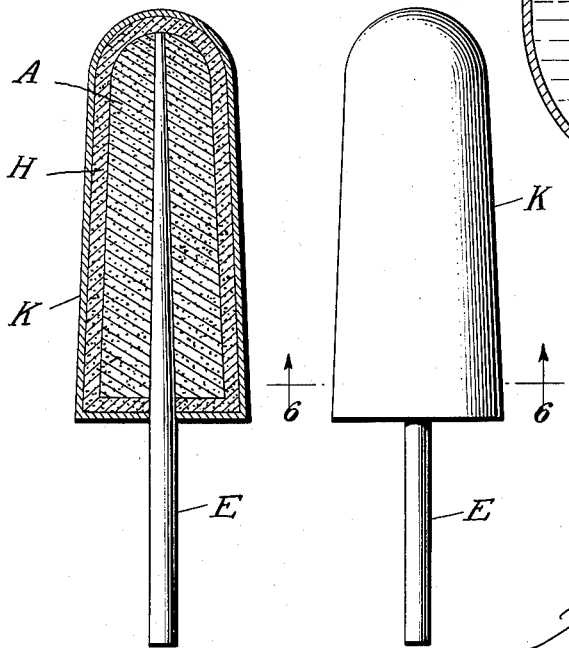
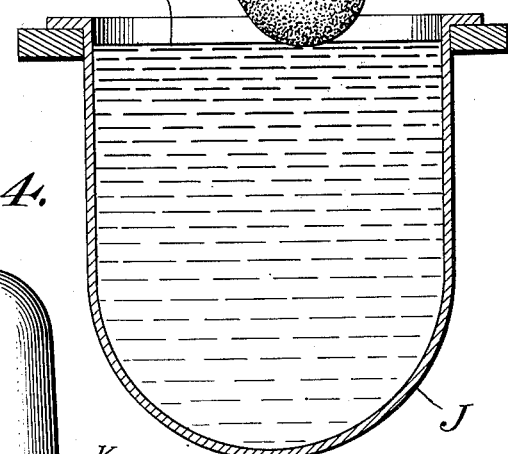
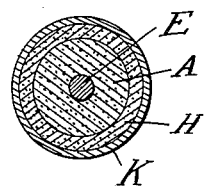
Inventor.
Henry J. Willems.

Patented July 21, 1936

2,048,364

UNITED STATES PATENT OFFICE 2,048,364

COMBINATION FROZEN CONFECTION

Henry J. Willems, Kenosha, Wis.

Application February 20, 1935, Serial No. 7,455

2 Claims. (Cl. 99—137)

The present invention relates to a new and useful improvement in a combination frozen confection of which the following is a specification.

This invention relates to a new and improved combination frozen confection having an inner core of flavored ice, formed mainly of water with flavoring matter and sweetening, called syrup, and an outer layer of ice-cream or the like normally fluid substance frozen to a substantially solid state, to the outer surface of the said inner core of flavored ice.

The object of this invention: It is impossible to enclose or coat a retaining casing on a body of flavored ice with our modern method of chocolate dipping. Therefore, I find it necessary to make a combination frozen confection.

The invention and all of its characteristics will be more fully described in connection with the accompanying drawing shown; the preferred embodiment thereof in views, in which:

Fig. 1 is a longitudinal cross-section view illustrating the method or process of uniting and adhering an outer layer of ice cream or the like normally fluid substance frozen to a substantially solid state to the outer surface of the core of flavored ice.

Fig. 2 is a detail view illustrating in a diagrammatic manner the dipping and forming of a chocolate retaining casing on the combination frozen confection.

Fig. 3 is a longitudinal sectional view through the combination frozen confection, illustrating the core of flavored ice and the outer layer of ice cream or the like frozen substance having a coated chocolate retaining casing.

Fig. 4 is a side elevation of the complete confection.

Fig. 5 is a view in transverse cross-section taken along the line 6—6 of Fig. 4.

In these views I have not shown the forming of the center core of frozen syrup or the process of affixing the handle member, because there are several methods of affixing the handle member. I will use the most efficient in my case, and anyone skilled in this art thoroughly understands the first step of congealing the syrup into a substantially solid state by refrigeration, but I have made clear the advanced process.

In these views like reference letters designate similar parts, and the reference letter A, indicates the center core of flavored ice body portion of the combination frozen confection. The center core of flavored ice, or frozen syrup body portion A, is placed in a refrigerating container B, as illustrated in Fig. 1. The receiving opening C, in the refrigerating container B, is considerably larger than the center core body portion of the ice confection A. The body portion A, is held in the center an equal distance from the surrounding wall of the refrigerating container B, by the supporting means D, which is temporarily attached to the ice confection handle member E, for supporting purposes during the preparation and refrigerating process.

The opening or space F between the ice confection body portion and the surrounding wall of the refrigerating container B, is filled with a substance G, in a mushy, soft, or fluid state, which is adhered by refrigeration to the center core of flavored ice into ice cream or the like frozen substance: or, the substance G, may be placed first in the refrigerating container B; when the body portion A is inserted into the container B, the substance G naturally rises in the opening or space F to a level entirely surrounding the ice confection body portion A.

After the refrigeration the substance G is frozen into a solid body portion H, to the outer surface of the body portion A. The combination frozen body is then removed from the refrigerating container B, and prepared for dipping as illustrated in Fig. 2. It is then dipped into the heated coating substance I, in the coating container J, and provided with an outer protective casing K, which is formed of edible non-moist preserving material, preferably when in a cool or frozen state that will instantly adhere and begin to harden on the surface of the frozen body as soon as it is withdrawn from the heated substance I, such as chocolate or any suitable candies or the like substance of such character that is comparatively hard, non-sticky, and a fairly good heat insulator and body retainer for the enclosed combination frozen body at normal temperatures. This enables the coated confection to be wrapped, handled, and consumed with some of the same advantages as other unfrozen confections and candies without having the surface of the flavored ice melting, running, and dripping on the hands and clothes of the consumer while consuming a low heat resistant refreshing dainty.

Further objects of the invention is to provide a combination frozen confection of this character as it is impossible to enclose or coat a body of flavored ice A, formed mainly of water with flavoring matter and sweetening (or of such substance that has a very low heat resistance when frozen to a substantially solid state) with the general process of coating by dipping such as in heated chocolate, as illustrated in Fig. 2, which has become popular as a method for forming retaining casings on frozen confections such as ice cream, which is formed of such substance that is more binding and stabilizing than flavored ice.

Flavored ice formed of less binding and stabilizing substance than ice cream, if put through the same process that ice cream is while being inclosed with a retaining casing by dipping in heated substance, the surface on the flavored ice instantly melts, not having enough binding material to go through such process, the coating cannot adhere and harden on a melting surface.

A further important feature of the invention is to provide a frozen confection of this character with a retaining casing formed of edible substance, such as chocolate, that can be put on with the general process of dipping. There are other methods of providing retaining casings that I find cannot be used successfully in this case. I find the most practical a coated retaining casing by dipping, to prevent the outer surface of the frozen body from being completely exposed while being consumed, and preventing the surface for a suitable time from melting and not having the syrup running over the hands and dripping on the clothes of the consumer, (mostly children) which is a natural occurrence of any unenclosed frozen confection, preferably of flavored ice or frozen syrups with a low heat resistance will drip in hot weather while being consumed.

Further, I find all frozen confections on the market formed of flavored ice or frozen syrups mainly of water, or low heat resisting fluids frozen, are served in an unsanitary manner to the public without any outer protective casing.

I also find all other frozen confections such as ice cream are served in receptacles, or having an outer retaining casing of some kind.

Therefore, I find it a necessity to make a combination frozen confection as described, and provide the public with a flavored ice refreshing dainty having a retaining casing and a suitable manipulating means so that flavored ice may also be served in a sanitary and pleasing manner.

While I have herein shown and particularly described the preferred embodiment of my invention, I do not wish to be limited to the precise details of construction shown, as changes may readily be made without departing from the spirit of my invention, but having thus described my invention, I claim as new and desire to secure by Letters Patent the following:

1. A combination frozen confection, comprising a retaining casing, a combination frozen center core formed of two grades of frozen substance, the center of such frozen substance that cannot be coated by dipping in heated coating substance, and the outer frozen substance of such nature that can be coated by dipping in heated coating substance forming the retaining casing, and an attached handle member for manipulating.

2. A combination frozen confection comprising a core of water ice, a relatively thin layer of a confection, which is fluid at normal temperatures and which congeals by refrigeration, surrounding the water ice and frozen thereto, and an outer casing of an edible substance, which is substantially fluid at a relatively high temperature and at a greater temperature than the core and thin layer, surrounding the thin layer and adhering thereto, the thin layer having a greater heat resistance than the core, whereby the core and protecting layer can be coated without materially melting by said edible casing substance, when the casing substance is in a fluid state.

HENRY J. WILLEMS.